United States Patent [19]
Ross et al.

[11] Patent Number: 6,017,174
[45] Date of Patent: Jan. 25, 2000

[54] CARGO RETAINING DEVICE

[76] Inventors: Douglas J. Ross, 635 Mill Pointe, Milford, Mich. 48381; Kenneth J. Ross, 641 Maplewood La., Wixom, Mich. 48393

[21] Appl. No.: 09/099,255

[22] Filed: Jun. 18, 1998

[51] Int. Cl.[7] .................................................... B60P 7/08
[52] U.S. Cl. .............................. 410/100; 410/97; 410/118
[58] Field of Search ............................. 410/97, 100, 117, 410/118, 96; 296/100.15, 100.16; 24/256 CD, 712.1, 713, 713.2, 714.6, 714.7, 714.8; 87/3, 61, 24; 248/499

[56] References Cited

U.S. PATENT DOCUMENTS

| 2,705,461 | 4/1955 | Campbell | 410/97 |
| 4,900,204 | 2/1990 | Summers | 410/97 |
| 5,040,934 | 8/1991 | Ross | 410/97 |
| 5,137,324 | 8/1992 | Hershberger | 410/97 X |
| 5,328,310 | 7/1994 | Lockney | 410/97 |
| 5,716,176 | 2/1998 | Anderson | 410/118 |
| 5,772,371 | 6/1998 | Ackerman | 410/118 |

FOREIGN PATENT DOCUMENTS

| 552350 | 1/1958 | Canada | 24/265 CD |
| 2854505 | 6/1980 | Germany | 410/117 |
| 404002534 | 1/1992 | Japan | 410/97 |

*Primary Examiner*—Stephen T. Gordon
*Attorney, Agent, or Firm*—Gifford, Krass, Groh, Sprinkle, Anderson & Citkowski, P.C.

[57] ABSTRACT

A cargo retaining device is disclosed for use in conjunction with the cargo bed of a vehicle, such as a truck or trailer. The cargo retaining device includes a net formed by crisscrossing strands of a nonelastic material and the net has a shape which corresponds to the shape of the cargo bed. An elongated cord extends around the outer perimeter of the net and this rope has a cross-sectional area substantially greater than the cross-sectional area of the strands. An elongated cinch rope is interweaved through the strands such that the cinch rope is parallel to and adjacent the cord. The cinch rope is optionally secured to the cord at one point and the cinch rope is utilized to secure the net to the vehicle and provide height adjustment.

9 Claims, 1 Drawing Sheet

CARGO RETAINING DEVICE

BACKGROUND OF THE INVENTION

I. Field of the Invention

The present invention relates to a cargo retaining device for vehicles having an open cargo bed.

II. Description of the Prior Art

Many vehicles, such as trucks, boats, trailers and the like include an open cargo bed designed to receive and hold cargo of various types. For certain types of cargo, especially light cargo, it is necessary to hold the cargo in the bed while the vehicle is traveling. Otherwise, the cargo may undesirably be blown or bounced from the cargo bed during travel of the vehicle.

There have been a number of previously known devices for retaining the cargo in the cargo bed. In one such device, the cargo is merely tied down by ropes, straps or the like. This particular method, however, is disadvantageous because it is time consuming and often not wholly safe or wholly effective.

A still further type of cargo retaining device comprises a net which is formed of an elastic material. This net is then attached to a vehicle such that the net overlies and extends across the cargo bed of the vehicle. A primary disadvantage of this type of previously known cargo retaining device is that the net is easily damaged not only by the cargo, but also by the environment. Furthermore, since the net is directly attached to the vehicle by hooks or the like, a great deal of stress is imparted to the net at its attachment point to the vehicle. This in turn damages the net and results in premature failure of the cargo retaining device.

A still further type of cargo retaining device is disclosed in U.S. Pat. No. 5,040,934 to Ross. The Ross cargo retaining device comprises a net formed by crisscrossing strands of a generally inelastic material, such as nylon. A cord having a cross-sectional area substantially greater than the cross-sectional area of the strands which form the net is then provided around the outer periphery of the net. The cord is then used to secure the net to a vehicle by attaching the cord to hooks formed on the vehicle around its open cargo bed.

A primary disadvantage of the Ross cargo retaining device, however, is that it is difficult to attach the cord to the vehicle when the top of the cargo contained within the cargo bed is spaced upwardly from the hooks provided on the vehicle around the cargo bed. When this occurs, it has been necessary to tie individual ropes such that one individual rope extends between each hook and the cord around the outer perimeter of the net.

SUMMARY OF THE PRESENT INVENTION

The present invention provides a cargo retaining device which overcomes all of the above-mentioned disadvantages of the previously known devices. In brief, the cargo retaining device of the present invention comprises a net formed by crisscrossing strands of a substantially inelastic material, such as nylon or polypropylene. The net is substantially the same shape and size corresponding to the shape and size of the cargo bed.

An elongated cord extends around the outer perimeter of the net and is secured to the crisscrossing strands. This cord has a cross-sectional area substantially greater than the cross-sectional area of the strands.

In order to secure the cargo retaining device to the vehicle, an elongated cinch rope is interweaved through the strands of the net around the outer periphery of the net such that the cinch rope is positioned adjacent to and substantially parallel to the cord. Additionally, the cinch rope preferably has two free ends and a midpoint of the cinch rope is preferably secured to the cord. Means are then provided to adjustably lock the free ends of the cord together to thereby vary the length of the cinch rope.

In use, the net is positioned across the cargo contained in the cargo bed. The cinch rope is then pulled outwardly from the net and looped around the hooks contained on the vehicle at each position of the net that is vertically aligned with the vehicle hooks. With the cinch rope thus positioned, the cinch rope is tightened thus compressing the net across the top of the cargo and the new effectively shortened cinch rope is locked together by the locking means.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
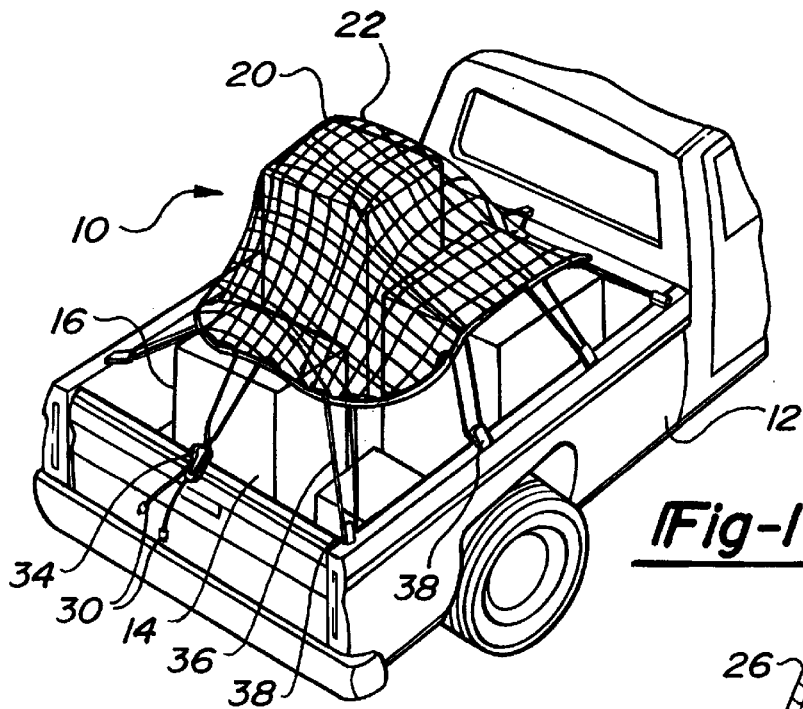
FIG. 1 is a perspective view illustrating a preferred embodiment of the present invention.

With reference first to FIG. 1, a preferred embodiment of the cargo retaining device 10 of the present invention is there shown for use with a vehicle 12 having an open cargo bed 14. As shown in FIG. 1, the cargo bed 14 is generally rectangular in shape and is design ed to contain cargo 16 which may extend above the top of the cargo bed 14.

Figure 2:
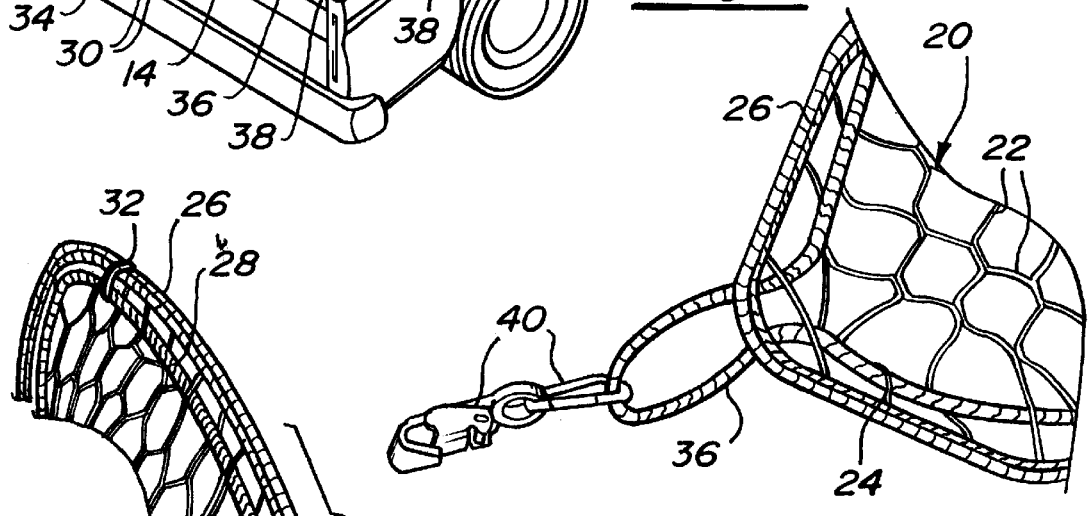
FIG. 2 is a fragmentary view illustrating a portion of the preferred embodiment of the present invention.

Referring now to FIGS. 1 and 2, the cargo retaining device 10 comprises a net 20 constructed of crisscrossing strands 22 which are secured together at their intersection 24 (FIG. 2) by any conventional means, such as by interweaving or knotting the crisscrossing strands 22 together. The net 20, furthermore, has a shape which substantially corresponds to the shape of the cargo bed 14 (FIG. 1) of the vehicle 12. Consequently, the net 20 illustrated in the drawing is substantially rectangular in shape.

The strands 22 of the net 20 are constructed of a substantially nonelastic material which is both weather resistant and resistant to physical damage. Preferably, the net 20 is constructed of nylon or polypropylene although other materials can alternatively be used.

Figure 3:
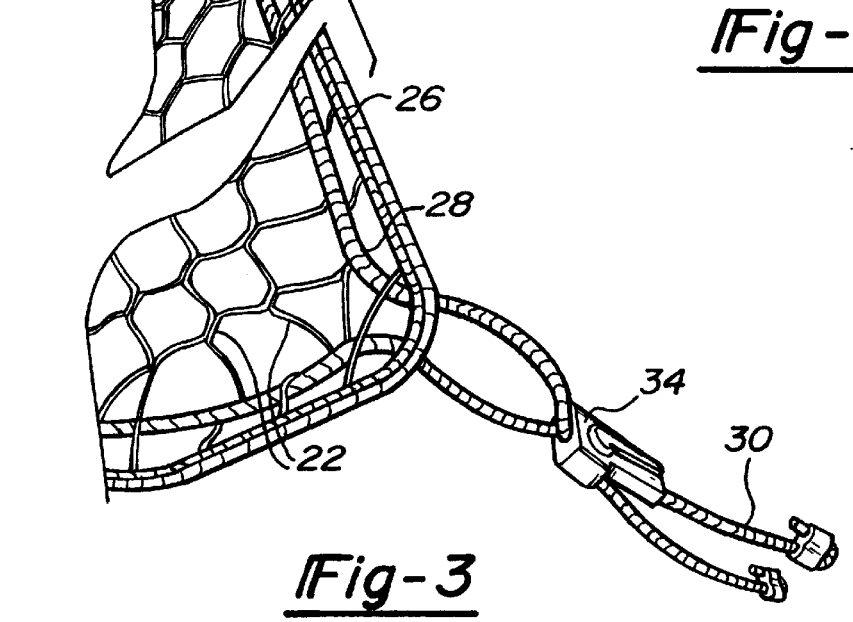
FIG. 3 is an exploded fragmentary view illustrating a still further portion of the preferred embodiment of the present invention.

Referring now to FIGS. 2 and 3, a cord 26 extends entirely around the outer perimeter of the net 20. Preferably, the cord 26 is constructed of nylon but other forms of nylon substitutes, such as polypropylene, that are also substantially nonelastic can alternatively be used. Furthermore, as best shown in FIG. 2, the cord 26 has a cross-sectional area substantially greater than the cross-sectional area of the strands 22. Preferably, the cross-sectional area of the cord 26 is at least ten times greater than the cross-sectional area of the strands 22.

Referring now particularly to FIG. 3, an elongated cinch rope 28 is interlaced through the net 20 about its outer perimeter such that the cinch rope 28 is parallel to and adjacent the cord 26. The cinch rope 28 is also preferably constructed of nylon or polypropylene and has a cross-sectional area greater than the cross-sectional area of the strands 22 and preferably the same cross-sectional area as the cross-sectional area of the cord 26.

Still referring to FIG. 3, the cinch rope 28 includes two free ends 30. Additionally, the cinch rope 28 is preferably secured to the cord 26 at a point 32 which is substantially midway between the free ends 30 of the cinch rope 28.

Still referring to FIG. 3, a manual locking device 34 is adjustably secured to the cinch rope 28 adjacent its free ends 30. When the locking device 34 is in an unlocked position, the locking device 34 is slidably along the cinch rope 28. Conversely, when the locking device 34 is moved to its locked position, the locking device 34 locks the free ends 30 of the cinch rope 28 together at the adjusted position of the locking device 34 thus effectively changing the length of the cinch rope 28 from the locking device 34.

With reference now to FIGS. 1 and 2, in operation, the cargo retaining device 10 is positioned over the top of the cargo 16 as shown in FIG. 1. The cinch rope 28 is then pulled outwardly from the net 22 to form loops 36 which extend downwardly from the cord 26. These loops 36 are then secured to hooks 38 secured to the vehicle 12 around the cargo bed 14 either directly or via auxiliary hooks 40 (FIG. 2) secured to the cinch rope 28.

With the cinch rope 28 positioned around the vehicle hooks 38 as shown in FIG. 1, the cinch rope is then tightened by moving the locking device away from the free ends 30 of the cinch rope 28 and thus effectively shortening the cinch rope 28. When the cinch rope 28 is tightly positioned around the hooks 38 so that the net 20 is compressed against the top of the cargo, the locking device 34 is moved to its locked position thus firmly securing the cargo retaining device 10 over the cargo 16.

From the foregoing, it can be seen that the cargo retaining device of the present invention provides a simple and yet effective cargo retaining device for vehicles having open cargo beds. Having described my invention, however, many modifications thereto will become apparent to those skilled in the art to which it pertains without deviation from the spirit of the invention as defined by the scope of the appended claims.

We claim:

1. For use with an open cargo bed of a vehicle, a cargo retaining device comprising:

a net formed by crisscrossing strands of a material, said net having a shape substantially corresponding in shape to the cargo bed, an elongated cord extending around the perimeter of said net, said cord having a cross-sectional area substantially greater than the cross-sectional area of said strands, means for attaching said net to the vehicle so that said net overlies and covers the cargo bed, said attaching means comprising an elongated cinch rope, said cinch rope being slidably interleaved through said strands such that said cinch rope is adjacent to said cord.

2. The invention as defined in claim 1 wherein said strands and said cord are constructed of an inelastic material.

3. The invention as defined in claim 2 wherein said cinch rope is constructed of an inelastic material.

4. The invention as defined in claim 2 wherein said inelastic material is nylon.

5. The invention as defined in claim 1 and comprising means for securing said cinch rope to said cord at one point.

6. The invention as defined in claim 5 wherein said cinch rope includes two free ends which extend outwardly from said net and wherein said point of securement between said cinch rope and said cord is substantially midway between said free ends.

7. The invention as defined in claim 6 and comprising means for adjustably locking said free ends of said cinch rope together.

8. The invention as defined in claim 2 wherein the in elasticity of said strands and cord prevents shifting of cargo outside of the cargo bed which may other wise result from wind loads during operation of the vehicle.

9. The invention as defined in claim 2 wherein said inelastic material is polypropylene.

* * * * *